(12) United States Patent
Karazi et al.

(10) Patent No.: US 8,054,451 B2
(45) Date of Patent: Nov. 8, 2011

(54) METHOD AND SYSTEM FOR DESIGNATING A TARGET AND GENERATING TARGET-RELATED ACTION

(75) Inventors: Uri Karazi, Nof Ayalon (IL); Benjamin Levy, Gdera (IL); Raphael E. Levy, Petach Tikva (IL); Valery Heymann, Yehud (IL)

(73) Assignee: Israel Aerospace Industries Ltd., Lod (IL)

( * ) Notice: Subject to any disclaimer, the term of this patent is extended or adjusted under 35 U.S.C. 154(b) by 354 days.

(21) Appl. No.: 12/375,321

(22) PCT Filed: Aug. 6, 2007

(86) PCT No.: PCT/IL2007/000977
§ 371 (c)(1),
(2), (4) Date: Jan. 27, 2009

(87) PCT Pub. No.: WO2008/018061
PCT Pub. Date: Feb. 14, 2008

(65) Prior Publication Data
US 2009/0323047 A1  Dec. 31, 2009

(30) Foreign Application Priority Data
Aug. 6, 2006 (IL) .......................... 177304

(51) Int. Cl.
*G01C 3/08* (2006.01)
(52) U.S. Cl. .................... 356/4.01; 356/3.01; 356/3.15; 356/4.1; 356/5.01; 356/5.15
(58) Field of Classification Search ......... 356/3.01–28.5
See application file for complete search history.

(56) References Cited

U.S. PATENT DOCUMENTS

| 6,003,810 A | 12/1999 | Roze des Ordons et al. |
| 2006/0250497 A1* | 11/2006 | Inbar et al. .................... 348/31 |

FOREIGN PATENT DOCUMENTS

| EP | 0 770 884 A1 | 5/1997 |
| EP | 0 833 122 | 4/1998 |
| JP | A-56-104263 | 8/1981 |
| WO | WO 2004/046750 A2 | 6/2004 |
| WO | WO 2005/050240 A2 | 6/2005 |

OTHER PUBLICATIONS

Heymann, Valery, "Weak Energy Target Detection," 11 pages, No Publication Information Available.
"Section 8: Detection, Resolution, and Recognition," *Electro-Optics Handbook*, pp. 109-125, No Publication Information Available.

* cited by examiner

*Primary Examiner* — Thomas Tarcza
*Assistant Examiner* — Luke Ratcliffe
(74) *Attorney, Agent, or Firm* — Oliff & Berridge, PLC (57) ABSTRACT

A system that includes a laser designator configured to continuously designate a target with a pulsed laser spot. The system includes a sensor and associated processing system configured to receive a reflection of the laser spot, convert the received energy to plurality of signals, processing the signals for detecting true reflected signals and process the true reflected signals for generating target related action. The sensor and associated processor are configured to detect the true signals notwithstanding an inherent low Signal/Noise ratio of below 4 of the received signals from due to low pulse power of the laser designator and distance to target.

36 Claims, 5 Drawing Sheets

METHOD AND SYSTEM FOR DESIGNATING A TARGET AND GENERATING TARGET-RELATED ACTION

FIELD OF THE INVENTION

This invention relates to designating targets using laser e.g. for homing intercepting objects onto the target.

BACKGROUND OF THE INVENTION

Designating targets using laser spots is a widely known technique due to the high precision of the pointing laser device and the relatively low cost of the homing head that utilizes a sensor which receives the energy reflected from the illuminated target, and then processing it for generating steering commands for homing the intercepting platform (such as an intercepting missile) towards the target (such as a moving vehicle).

In accordance with known laser spot guiding techniques (as illustrated schematically in FIG. 1), a laser designator 1 fitted on a given platform 2 constantly tracks the target 3 and illuminates it in a laser beam 4 pulsed spot. Also shown is an intercepting missile 5 employing a sensitive sensor. The sensor's surface is usually divided into four equal sectors (not shown in FIG. 1) and associated spectral filter which transfers most of the energy (reflected from the illuminated target as well as a certain (low) portion of noise that stems, e.g. from sunlight (not shown)). The energy received in each of the sectors of the sensor is converted into corresponding signal intensity. The differences between the signal intensities in the respective sectors are used to calculate the direction to the target (line of sight—LOS 6) and/or the change of direction LOS rate. The calculated LOS and/or LOS rate serve for steering the missile for homing onto the target 7.

Figure 1:
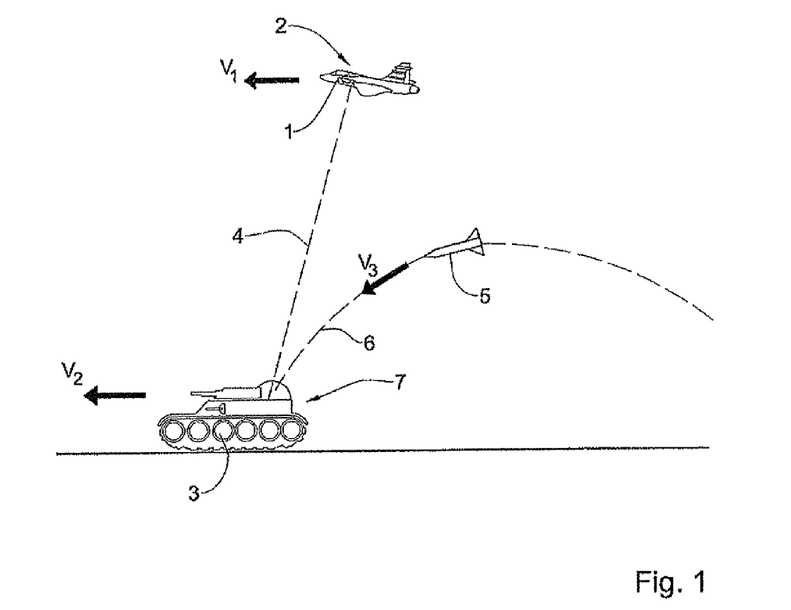
FIG. 1 illustrates generally a typical scenario of intercepting an armored vehicle using laser pointing technique.

In accordance with a typical (yet not exclusive) scenario, the laser designator 1 transmits pulses at a rate of 10-20 Hz, facilitating sampling at this rate for homing purposes. The wavelength that is used is e.g. 1064 nanometers. Each pulse is narrow (15-20 nanoseconds) and has generally an energy of 60 to 120 m joule. The energy received by the sensor is converted to electrical current/voltage, depending also on the sensor's sensitivity. In order to secure sufficient Signal/Noise ratio (e.g. above 6) that will be received in the sensor and will allow to discern between the true signal from the ambient noise (such as sunlight) at a sufficient level of certainty, the output power of the laser designator 1 is of the order of 3-8 Megawatts. This output power of the laser would allow the intercepting missile to process the so discerned signal at sufficient range from the target, affording at least 6-10 time constants which are required for properly steering of the intercepting missile in order to achieve an accurate homing 7 onto the target. In case the energy received at the sensor is too low, this will hinder properly. discerning between the signal and noise, thereby adversely affecting the calculation of the angular error and angular error rate, and thereby degrading the prospects of duly hitting the target.

The hitherto known techniques suffer from one or more of the following limitations, including:

The relatively high price tag of the laser designator (which illuminates the target) that meets the specified operational specification, The relatively large physical dimensions of the laser designator as well as the relatively high weight which hinders the possibility to carry portable laser designators by a person such as an infantry individual, or fitting them in, a vehicle, such as small flying platforms (for instance UAV) which can fly under the clouds.

There is, thus, a need in the art for a new low-weight and low-cost laser designator device, and a corresponding sensor and associated processor that will facilitate appropriate designating of moving targets, e.g. for display purposes, and whose laser can be carried by a platform that is limited by its, capacity to carry heavy payload, such as an infantry soldier, low weight flying platform (possibly) unmanned air vehicle (UAV), etc.

There is still a need in the art for laser designators and/or sensor and an associated processor that will facilitate the operation of intercepting platforms such as missiles for homing onto moving or stationary targets.

There are known in the art low pulse power lasers, for instance those utilizing fiber optics technology (hereinafter fiber optics lasers). A typical, yet not exclusive example is the 10-20W Pulsed Fiber Lasers commercially available from SPI Lasers Company, which is illustrated schematically in FIG. 2. Such lasers are in many cases considerably lighter and cheaper than the specified laser designators, but they have low pulse power capacity of the order of 1-4 mjoules per pulse. The fiber optic lasers can generate a relatively high pulse frequency of the order of 5000 Hz at very accurate timing.

Figure 2:
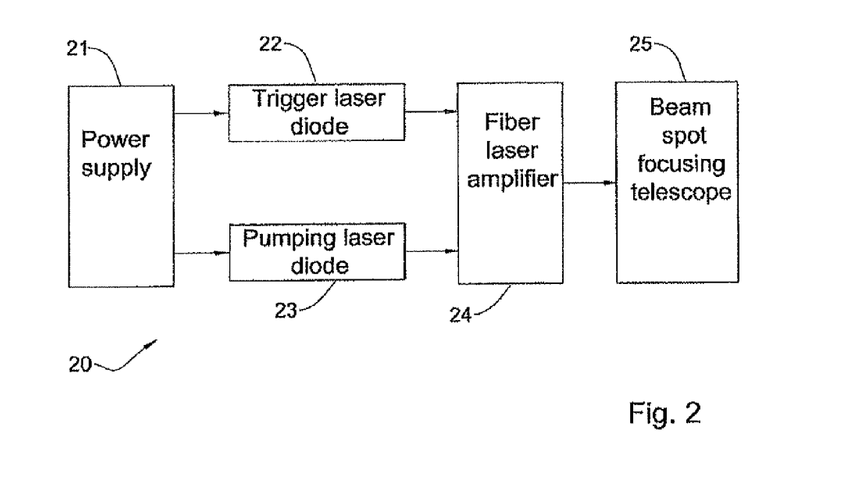
FIG. 2 illustrates a simplified block diagram of a fiber optics laser, in accordance with the prior art.

As shown in FIG. 2, a typical, yet not exclusive, fiber laser designator 20 consists of a power supply 21 coupled to a trigger laser diode 22 and pumping laser diode 23 both coupled to fiber laser amplifier 24 which, in turn, is coupled to beam spot focusing telescope 25 that generates the laser spot that illuminates the target. Note that the generated laser pulses are rather narrow, say of the order of 20-25 nanoseconds.

The operation of the fiber optics laser designator is generally known per se and therefore will not be further expounded upon herein.

There is a further need in the art for utilizing the low weight and relatively cheap fiber optics lasers for the specified applications such as designating targets (e.g. for display purposes), and/or homing an intercepting object, such as a missile, onto a mobile or stationary target, and/or measuring distance and/or velocity to targets. These applications are applicable, notwithstanding the inherent low pulse power output of the fiber optics lasers.

List of related art: WO 2005/050240 entitled "Method and System for Determining the Range and Velocity of a Moving Object" discloses a device for determining the range of a moving object, the device including at least one sampler, a multi-process array coupled with the sampler and a selector coupled with the multi-process array, the sampler producing a plurality of sampled signals by sampling a received signal respective of a sequence of pulses transmitted toward the moving object, the multi-process array running a plurality of processes, each of the processes associated with a respective time shift which is determined according to a respective radial velocity assumption of the moving object with respect to the device and with a pulse rate of the sequence of pulses, each of the processes producing a signal summation by sequentially shifting the sampled signal by the respective time shift and adding together the sampled signals, the selector determining the range according to at least one signal summation which includes a summed pulse event.

SUMMARY OF THE INVENTION

The invention illustrates a system, comprising:
a laser designator configured to continuously designate a target with a pulsed laser spot;

a sensor and associated processing system configured to receive a reflection of the laser spot, convert the received energy to plurality of signals, processing the signals for detecting at least one true reflected signal and process at least one of the true reflected signals for generating target related action, and wherein said sensor and associated processor are configured to detect said at least one true signal notwithstanding an inherent low Signal/Noise ratio of substantially below 4 of received signals from among said plurality of signals due to at least one factor selected from a group that includes low pulse power of the laser designator and distance to target. The invention further illustrates a method for designating a target and in response generating a target related action, comprising:

designating a target with a pulsed laser spot;
receiving a reflection of the laser spot;
converting the received energy to plurality of a signals, processing the signals for detecting at least one true reflected signal notwithstanding an inherent low Signal/Noise ratio of substantially below 4 of received signals from among said plurality of signals due to at least one factor selected from a group that includes the low pulse power and distance to target; and
processing at least one of the true reflected signals for generating target related action.

Still further, the invention illustrates a system, comprising:
a laser designator configured to continuously designate a target with a pulsed laser spot; a time duration between consecutive pulses generated by said laser designator constitutes an inter-pulse time duration that is divided into plurality of I cells each having time duration that substantially matches a width of a pulse as received and processed by a sensor and associated processing system;

the sensor and associated processing system are configured to receive a reflection of the laser spot, convert the received energy into a plurality of sampled signals, and store in each cell a sampled signal value which may be a sought true signal, a noise or combination thereof;

the sensor and associated processing system are configured to discern between signal and noise for detecting a true reflected signal including applying non-coherent integration of sampled signals.

As readily arises, in accordance with certain embodiments, the invention provides a technique for increasing the prospects of discerning between signal and noise for obtaining at least one true reflected signal notwithstanding an inherent low Signal/Noise ratio of the received signal, or decreasing the prospects of false alarm, namely detecting what appears to be a true signal, but in fact is not.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

The invention is described, for convenience only with reference to intercepting targets. The invention is not bound to this particular application. Other non-limiting target related actions may be applicable, such as displaying target data, measuring distance to target and/or relative velocity and/or others.

Note that the specific system specifications provided above (e.g. with reference to FIGS. 1 and 2) and below, are for illustrative purposes only and are by no means binding. Thus, for example, the invention is not bound by the use of fiber optics lasers, and a fortiori not by the specific system architecture of FIG. 2. Typical, yet not exclusive, examples of fiber optics lasers are 10-20 W pulsed fiber lasers, commercially available from SPI lasers company, or YLP high energy pulsed ytterbium Fiber Lasers, commercially available from IPG Photonics Lasers company.

The invention is described with reference to lasers generating pulses at high frequency (say, at least 1 KHz) and at low intensity (say, of up to 10 Mili Joules per pulse).

In accordance with certain embodiments, the invention is described with reference to an intercepting platform, a missile being an example.

Figure 3:
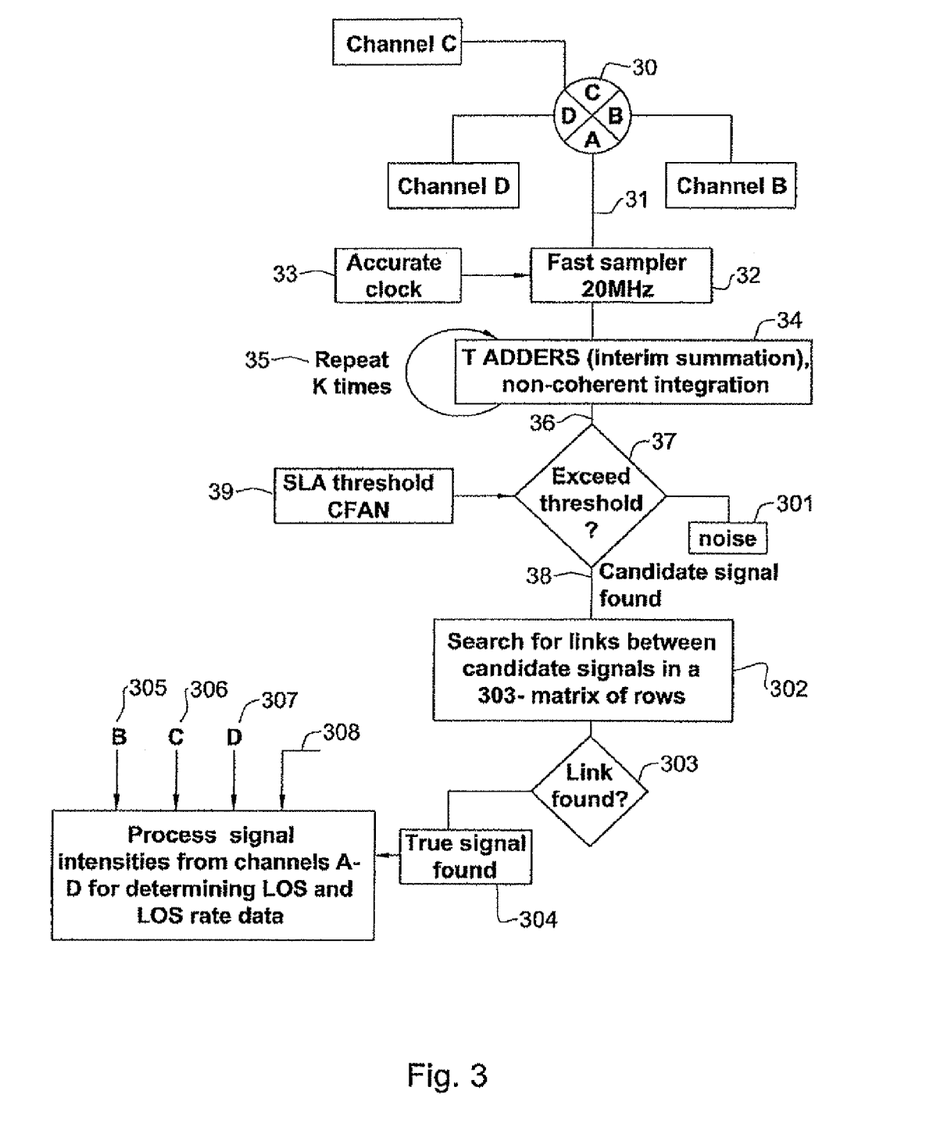
FIG. 3 illustrates a block diagram of a sensor and associated processor, in accordance with an embodiment of the invention.

Bearing in mind a typical operational scenario as depicted in FIG. 1, attention is drawn to FIG. 3, illustrating a block diagram of a sensor and associated processor, in accordance with an embodiment of the invention.

As may be recalled, the sensor is fitted on an intercepting object (say, missile 5). As shown, the sensor includes a sensor head 30 that is divided into four sectors, designated A to D, respectively. Each sector has a distinct processing channel constituting a part of a processing system. For simplicity only the processing channel of channel A 31 is elaborated. The other sectors B to D are associated with substantially identical processing channels and are processed substantially simultaneously.

The energy reflected from the target (in response to the illuminating spot of the designator pulse) is received by the sensor together with energy originated from ambient noise (such as sunlight) and is converted to a signal that is fed to a fast sampler 32 controlled by an accurate clock 33. In accordance with certain embodiments the sampler samples at a rate of e.g. 20 MHz. For the specific case of 20 MHz, it consists of 4000 inter-pulse durations (each extending to 250 μsec) and, say 5000 samples per time duration, each (by this example) extending over 50 nanoseconds. The inter-pulse duration corresponds to the pulse rate (4000 Hz) of the laser designator and each sample (say, 5000 per inter-pulse time duration) corresponds more or less to the width of the pulse generated by the laser designator, all as will be explained in greater detail below.

It should be noted that the clock that controls the sampler operation is not necessarily synchronized with the clock that controls the pulse generation in the laser designator.

As was explained above, the intensity of the received signal is relatively low (due to the relatively low pulse power of the fiber optics laser designator), hindering the processing phase which attempts to discern between noise and detect at least one true reflected signal. It is therefore required to increase Signal/Noise ratio (which may be approximately below 4 for many out of the plurality of the received signals) in order to increase the certainty of detecting a true signal that is reflected from the target, or, in other words, to increase the probability of detection (POD) and reducing false alarm rate (FAR).

It is well known that non coherent integration of X pulses that consist of signal and noise (in ambient conditions of random noise) will enhance a Signal/Noise ratio by a factor of $\sqrt{X}$ compared to the Signal/Noise ratio of a single sampled received pulse, which, as specified, may be below 4.

As will be explained below, in accordance with certain embodiments of the invention, said sensor and associated processor are configured to apply a non-coherent integration of K received pulses for identifying candidates for true signal component. The non coherent integration will strengthen the inherent low signal to noise ratio of each pulse (due to the low pulse power of the laser designator) by a factor of $\sqrt{K}$. Thereafter, an additional process is applied to up to N candidate signals (from N blocks of K lines each) in order to find links between candidate signals for detecting a true signal and thereby achieve efficient tracking and guiding (if necessary including homing) an intercepting object onto the target. The additional process phase will further enhance the Signal/Noise of the candidate signal by additional factor of R being up to $\sqrt{N}$. The net effect would then be that a true signal has an improved Signal/Noise ratio by a factor of $\sqrt{K} \cdot R$ compared to the Signal/Noise ratio of a sampled received single pulse.

In accordance with certain embodiments and as will be further elaborated below, the inter-pulse time duration is divided into plurality of cells each having time duration that substantially matches the width of a pulse (as received and processed by the sensor). Each cell holds a sampled (after having been converted to digital form) signal value which may be the sought signal, a noise or combination thereof.

Next, few signal values in corresponding vertical cells are summed (giving rise to interim summation) and compared to a given threshold in order to give an indication whether the summed signal is representative of a candidate for true signal (if the summed value exceeds the threshold) or otherwise a noise, all as will be explained in greater detail below with reference to FIG. 5.

This is illustrated schematically in FIG. 3, where 5000 samples per inter-pulse time duration are fed to respective 5000 adders 34 and each adder adds K pulses vertically 35 (for successive K inter-pulse durations), giving rise to respective 5000 interim summed values (36) each being compared to a threshold 37 and in the case that it exceeds a given threshold a candidate signal is detected 38, or otherwise noise (301). The threshold value is determined 39 in accordance with various parameters (such as false alarm rate which should be low enough). Each adder that sums K vertical signal values (and applied simultaneously to 5000 samples, using 5000 adders respectively) realizes a non-coherent integration and improves (as specified above) the Signal/Noise ratio by a factor of $\sqrt{K}$. The non-coherent integration for identifying candidate signals will be exemplified in greater detail, with reference to FIGS. 4 and 5 below.

In accordance with certain embodiments, after having identified candidates for true signal, there follows a procedure for detecting true signals from among N bulks of candidate signals 302 (which appear in a table of I cells and N rows), by finding links between the candidate signals 303 all as will be explained in greater detail below, In accordance with certain embodiments, after having detected a true signal in channel A 304, the value is compared to the so detected (possibly) true signals (if any in channels B to D, 305 to 307; respectively), in order to calculate the error and therefrom derive LOS direction and/or LOS direction rates to the target 308, which will facilitate appropriate guidance to the target (including, whenever necessary) homing onto the target, all as will be explained in greater detail below. LOS direction and/or LOS direction rates are examples of LOS related data.

In accordance with certain embodiments, time of arrival related data is used, e.g. for measuring distance to the target and/or relative velocity laser designator, the target and the intercepting platform.

In accordance with certain embodiments, the candidate signals findings of all the channels are integrated, and only afterwards a link between candidate signals is sought for detecting true signals, all as will be explained in greater detail below.

The procedure of finding links between candidate signals will also be explained in greater detail below, with reference to FIGS. 4 and 5.

Note that the flow chart illustrated in FIG. 3. with reference to certain embodiments of the invention, is by no means binding.

Bearing this in mind, there follows, a more detailed description of non-coherent processing in accordance with various embodiments of the' invention, with reference also to F*ig*.4 and FIGS. 5A-D. Note that the numerical examples are provided for convenience only and are by no means binding.

Before turning to explain the manner of operation in accordance with certain embodiments, there follows a description in respect of few parameters F,T,n,S,N and K (with reference also to FIG. 4), which are applicable in accordance with certain embodiments of the invention. Whilst the description below refers to the parameters in this particular order, the determination of these parameters is of course not bound by this order.

As exemplified above, the laser designator 1 (see FIG. 1) generates, say 4000 pulses (F) per second and having inter-pulse time duration of 250 μsec between consecutive pulses, each having a pulse width of substantially 20-25, nanoseconds, The sensor that is fitted on missile 5, receives the reflected energy and samples I signals (in this example 5000) per each inter-pulse time duration where each sample includes ambient noise and 1-3 (of the I samples) include also the received (and processed) reflected energy (of true reflected signal).

Note that the pre-amplifier and amplifier controller (see FIG. 2) expand the pulse width from 20-25 nanoseconds (as generated by the laser designator) to substantially 100 nanoseconds, and therefore each sample extends over about 50 nanoseconds (100/2 according to the sampling theorem). Note, that the width of the generated signal is narrow (of the order of 100 nanoseconds) and it is not known in advance where in the 250 μsec inter-pulse duration. (or in other words, where in the 5000 samples per inter-pulse duration), the reflected signal (true signal) that stems from the narrow generated designating pulse, will fall.

As specified above, the sampled true signals are "contaminated" by noise that needs to be filtered out.

Having determined F and T (41 and 42), there follows a description of the rate of steering updates n (43), in accordance with certain embodiments of the invention. The more the updates (in certain embodiments up to 20 updates per second) the higher the prospects of duly tracking and guiding (homing) to the target. Note, however, that initially it is required to discern between the signal and noise which, in accordance with certain embodiments, may pose a tradeoff between the steering commands update rate and the number of processed pulses per update. For a better understanding of the foregoing, it should be borne in mind that the received signal is inherently of low intensity due ,to the low pulse power laser, and further due to the fact that at the initial intercepting phase by the intercepting platform is relatively far away from, the designated target and therefore the signal intensity is further diminished, due to the traveling distance of the signal from the target to the sensor. In order to discern between the signal and noise (notwithstanding the low signal intensity discussed above) a so-called non-coherent integration is utilized (in respect of K signals) and therefore achieving an enhancement of Signal/Noise by a factor of $\sqrt{K}$, all as further explained below.

Amongst the others, the non coherent integration .concerns summing incoming signal pulses for identifying candidate signals and as a preparatory step for finding links between candidate signals for detecting true signal. In accordance with certain embodiments, the number of signals that need to be processed (summed in a non coherent integration for identifying candidate signals and further processed for detecting true signal by identifying links between the candidate signals) is dependent upon the number of times (per second) that update steering commands should be generated for guiding (including homing, whenever necessary) the intercepting platform towards the target. Generally speaking, the lower the estimated signal intensity, the more signals that need to be processed in order to detect true signal. Naturally, when the interceptor is at a large distance from the target, the reflected signal's intensity is lower (due to the $1/R^2$ propagation attenuation, for large traveling distance R from the target to the receiving sensor) and more signals need to be processed in order to discern signal from noise, compared to a shorter distance where the signal's intensity increases (due to the shorter traveling distance R of the signal from the target to the receiving sensor). As discussed above with reference to FIG. 1, based on the detected (true) signals, the LOS direction and/or LOS direction rates data can be calculated and therefrom the required steering commands. Thus, in accordance with certain embodiments, in the case of low intensity signal (far distance) more signals are processed per update and consequently less updates are available per second. As the intercepting platform approaches the target, the signal intensity increases, less signals need to be processed until true signal is detected and more updates are available per second.

Figure 4:
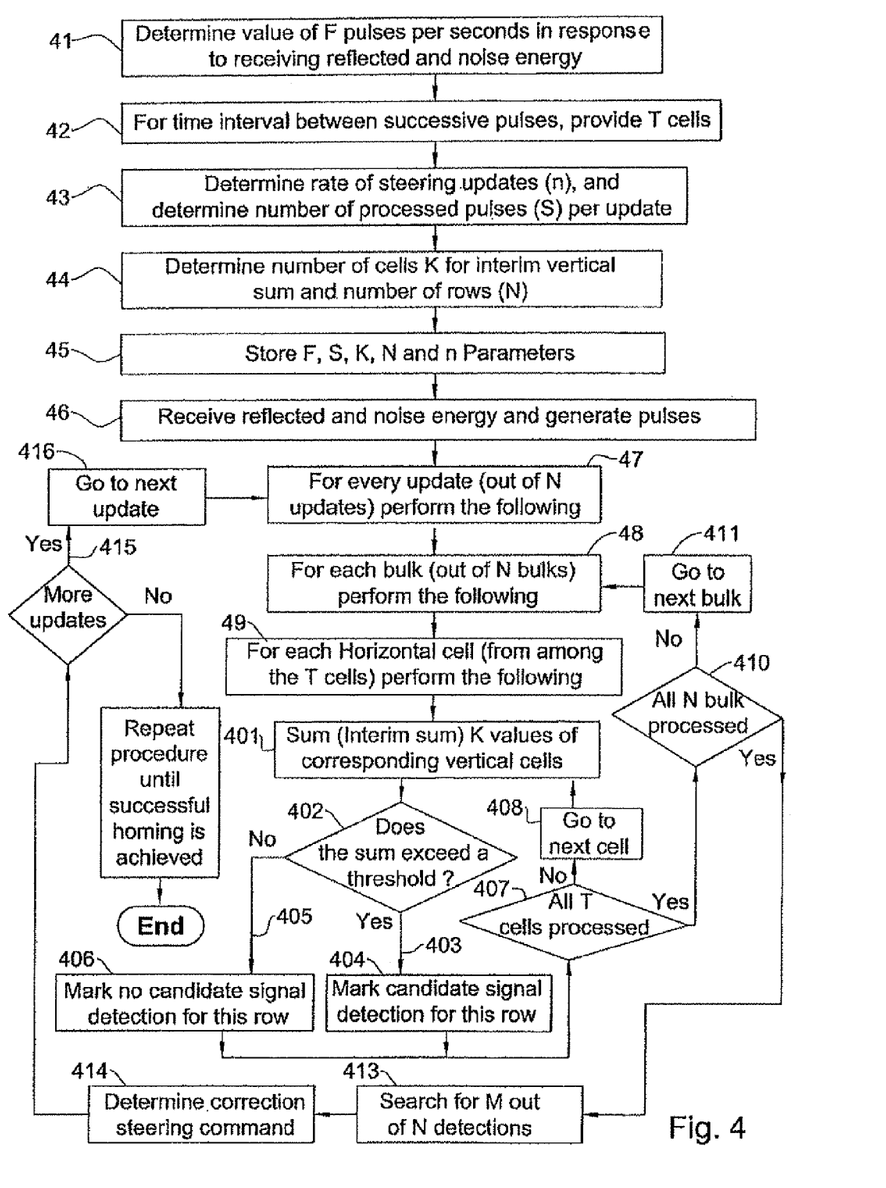
FIG. 4 illustrates a flow chart of non-coherent processing, in accordance with an embodiment of the invention.

In accordance with certain embodiments, the number of updates per second is designated n and the number of pulses that needs to be processed per update is S (43 in FIG. 4). S indicates the maximum number of pulses that can be processed in order to meet the requirement of n updates per second. S, F and n comply with the following equation:

$$S \cdot n = F$$

By one example F is 4000 and for n=10 updates, S is 400, whereas for n=4 updates, S is 1000.

In accordance with certain embodiments, the number of pulses per update (S) is processed in N bulks of K pulses. In accordance with certain embodiments, the K pulses are used for the non-coherent integration (interim summation). In certain embodiments, substantially corresponding K vertical cells are summed (giving rise to interim summation) and compared to a given threshold in order to give an indication whether the summed signal is representative of a candidate for true signal (if the summed value exceeds the threshold) or otherwise a noise. For the exemplary 250 μsec inter-pulse duration and 5000 (T) cells, each cell (e.g. cell #i out of 5000 cells of the first inter-pulse period of 250 vsec) holds a sampled signal intensity value (current or voltage, whichever the case may be). The next corresponding vertical cell is cell #i out of 5000 cells of the second inter-pulse duration of 250 μsec holds a sampled signal intensity value, and so forth for the 4000 samples per second.

In accordance with certain embodiments, it is assumed that if a true signal (reflected from the target) falls in a given cell (say, the specified cell #i), the relative location of the target and intercepting platform will stay substantially the same for a succession of additional signal samplings and therefore the signal is likely to reside in the same cell (i.e. cell #i) also for few consecutive samplings.

Bearing in mind that the inter-pulse duration (e.g. 250 μsec), and further taking into account the relative velocities of the intercepting platform (although not explicitly known) are within predefined tolerance as well as other parameters (such as inaccuracies between the laser designator clock and the sensor's clock), it is possible to estimate the number of consecutive vertical cells in which it is likely to assume that the received signal is reflected from the target and that the signal is not "drifting" to neighboring cells. Note that in accordance with certain embodiments the non coherent integration of K vertical cells is performed in respect of each one of the I cells, using I adders (see 32 of FIG. 3).

In accordance with a certain embodiment, K ($\leq K_{MAX}$) complies with the following equation:

$$K_{MAX} = C \cdot t / V \cdot T$$

where,

C is the speed of light, t is the width of a sampling cell Cm the latter example 50 nanoseconds), T is the inter-pulse time duration (in the latter example 250 μsec), V the relative velocity between the laser designator, target and intercepting platform.

Thus, for example, for V=300 m/sec, $K_{MAX}$=200. This means that the non-coherent integration is applied to K (up to 200) vertical cells, since otherwise the received signal that is reflected from the target is likely to drift to a neighboring cell. The same $K_{MAX}$=200 applies to a situation where the difference between the clocks is $10^{-6}$.

After having determined K, also N (44) is determined in accordance with the following equation:

$$S = K \cdot N \text{ all as will be explained in greater detail below.}$$

Note that the non-coherent integration of K pulses (intrabulk) will lead to determining candidates for true signals and the inter-bulk processing among up to N bulks of K pulses will attempt to find a link between the candidate signals and detect a true signal, all as will be exemplified below.

The specified parameters are stored (if desired off-line) and used later, as will be discussed below.

Figure 5A:
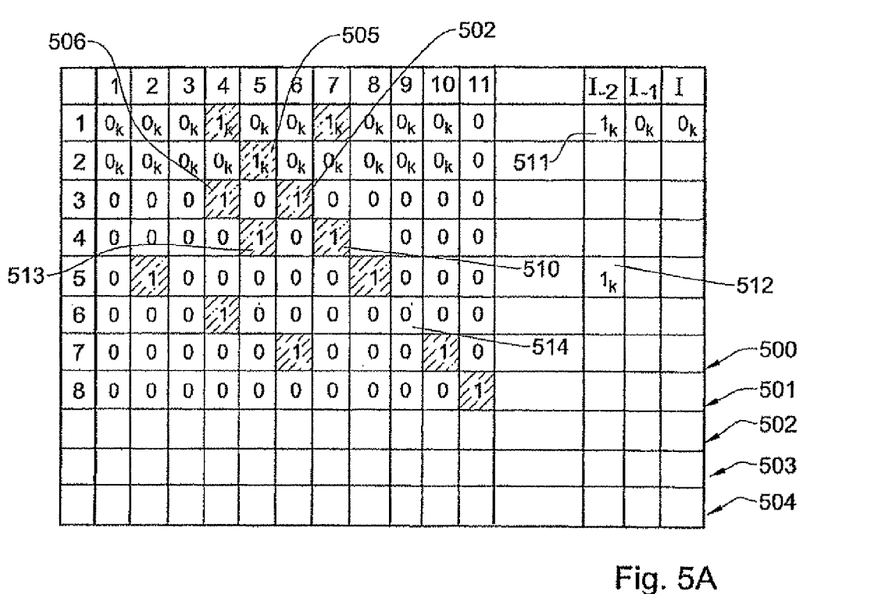
FIG. 5A-D illustrate exemplary charts for explaining the non-coherent processing in accordance with certain embodiments of the invention.
Figure 5B:
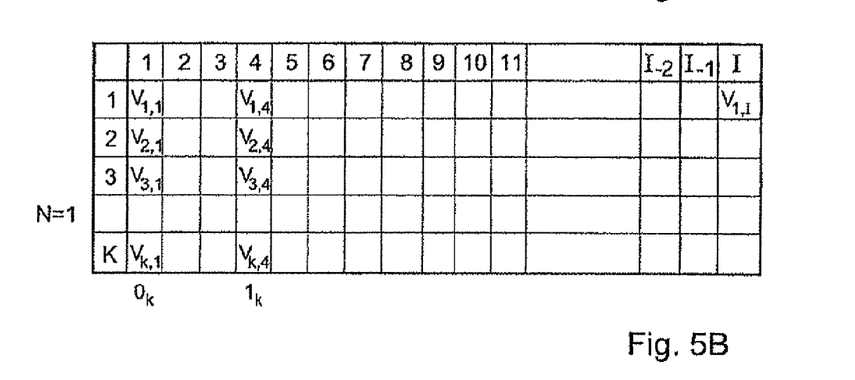

Before moving forward, it should be noted that in case the interceptor is far away from the target, the Signal/Noise ratio is naturally low and consequently the prospects of discerning between signal and noise (as will be discussed with reference to FIG. 5-B, below) is very limited. This may create numerous false alarms, each seemingly indicating the existence of a signal value, whereas in reality it is a noise having energy level which is very close to that of the low signal value. In this situation the specified $K_{MAX}$ used for non-coherent integration (and improving the Signal/Noise ratio by a factor of $\sqrt{K}$)

is still insufficient. It is therefore desired to further increase K to exceed the specified $K_{MAX}$, enabling sufficient improvement of the Signal/Noise ratio. In accordance with certain embodiments, K can be increased whilst restraining the received signal substantially within the K vertical cells, by modifying the value of I (number of cells discussed above) to I' such that I' corresponds to the value of V, and thereby preventing leakage to neighboring cells. Note that in certain embodiments, in order to comply with the specified stipulation (I' corresponding to V), the former may have a non-integer value, which is obviously infeasible, considering that it stands for a number of cells (having integer value). In this case, I' is rounded to the nearest (lower or upper) integer value and the missing or excessive cell (due to the rounding operation) is compensated (i.e. added or deleted, which the case may be) every few time intervals, such that by average, the desired (non integer) I' value is accomplished.

In accordance with certain embodiments, K can be increased whilst restraining the received signal substantially within the K vertical cells, by adapting the time width t of a sampling cell to the value of V and preventing leakage to neighboring cells. Note that by these embodiments the number of cells I is not modified.

Figure 7A:
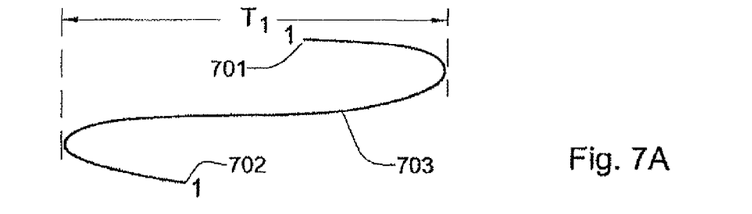
FIGS. 7A-B are two exemplary illustrations of monitored signals separated by inter-pulse duration, in accordance with certain embodiments of the invention.
Figure 7B:
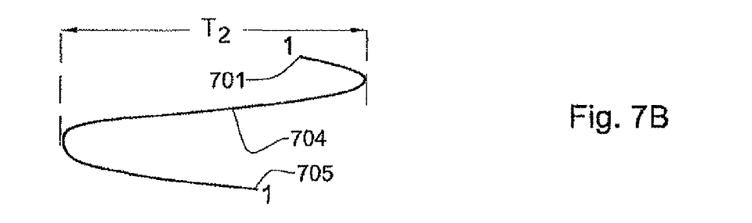

This is achieved by modifying the value of T' (the inter-pulse duration as perceived by the receiver) in order to compensate for (i) the difference between clocks in the designator and the receiver, respectively and (ii) the frequency shift that results from Doppler frequency shift of the pulse rate, due to the velocity V (complying with the equation T'=T/(1+V/c)), such that T' will lead to increased $K_{MAX}$. Graphically, this can be illustrated in FIG. 7 where in FIG. 7A it is shown a signal appearing in cell #i 701 and in the next pulse (after one inter-pulse duration has elapsed) it appears in cell j<i 702. The "route" 703 is proportional to the velocity V and depends on the number of cells I. As shown, the signal drifted from cell #i (to #j), affecting thus the non-coherent integration value of cell #i. Assuming now that I is reduced to smaller value I' (or alternatively modifying T'), then under the same velocity conditions V (namely extending along the same route-now designated 704) the signal that has appeared in cell #i will appear in the same cell #i 705 of a succeeding pulse, thereby naturally increasing K (i.e. adding more cells to the non-coherent integration wherein the signal has not drifted to a neighboring cell) with the net effect that the Signal/Noise ratio is increased (due to the larger K). Note that in this manner, I' (or T' as discussed above) can be controlled, thereby increasing K, until sufficient Signal/Noise improvement is achieved.

Those versed in the art will' also appreciate that the various parameters K,N,n,S and T discussed, herein are by no means binding and accordingly one or more of the specified parameters may be modified and/or others may be added in addition or instead of one or more of the specified parameters. Note also that the term N signifies number of bulks, Signal/Noise signifies signal to noise ratio (in the conventional manner) and M (<=N) as will be discussed below.

Having determined and stored the specified, parameters (45), there follows a description of a sequence of operation, in accordance with certain embodiments of the invention and with reference to FIGS. 4 and 5. FIG. 5A illustrates a table having I (e.g. 5000) columns (cells) each, as may be recalled, representing a time duration of 50, nanoseconds such that the time duration of all 5000 cells amount for the time interval between consecutive pulses (inter-pulse time duration), i.e. 250 μsec. The rows represent N lines (in the example of FIG. 5A, N=8, where each row represents interim (vertical) summation of K sampled pulses. This is illustrated more explicitly in FIG. 5B showing only the first row (N=1), which, as shown, is divided into K lines, each holding sampled signal intensity.

Assuming that at the beginning the signal is relatively weak, so that a higher number of pulses needs to be processed before a clear indication of a true pulse is achieved. In the example of FIG. 5A, it is assumed that initially 5 updates per second are performed, leaving thus 800 pulses for processing per update. (S=800). FIG. 5A depicts in more detail the $S_1$ (500) processing (for the first update) and marks more generally the other 4 updates per second ($S_2$ to $S_5$, 501 to 504, respectively), giving rise to the specified n=5 updates per second.

Focusing on the first update ($S_1$=800), assume that non-coherent integration is applied to 100 corresponding vertical cells (interim sum), i.e. by this example K=100, then naturally it readily arises that there are N=8 bulks.

Bearing this in mind, attention is reverted to FIG. 4 for describing the processing sequence in respect of every update (out of the n updates), in accordance with certain embodiments. Note that the invention is not bound by the specific sequence of operation described with reference to FIG. 4 as well as not by the specific charts of FIG. 5 and a fortiori by the numerical examples which are provided for illustrative purposes only.

Thus, the energy received by the sensors is sampled at 20 MHz 46. Next, the following processing sequence is performed for every update (47) (out of the n updates).

For each update, the S signals are processed in two phases, per bulk and across (inter) bulks. Per bulk (48), it is assumed that the relative relationship between the target and the intercepting platform is substantially maintained for the entire K samples (e.g. in this particular example for a duration of 100·250 μsec=25 msec) and accordingly if a signal reflected from the target falls in a given cell (i.e. a given timing of 50 nanoseconds within the 250 μsec inter-pulse duration) there is a high probability that it will be found in the same timing in the succeeding 99 samples. As may be recalled, the signal intensity that is sampled in each sample is relatively low, however if K (100 by this example) successive signals are summed, this amounts to higher value. Thus, interim summation of 100 corresponding vertical cells in which the true signal resides (possibly together with some additional noise component) is likely to amount to considerably higher value than the interim sum of 100 cells which do not accommodate sampled signal, but rather noise only. As explained above, the net effect of applying non-coherent integration for K signals is improving the Signal/Noise ratio by a factor of about $\sqrt{K}$.

Attention is now drawn to FIG. 5B, showing, for example, for the K (=100) lines of the bulk (i.e. N=1). The signal value for each cell (50 nanoseconds) is sampled, giving rise to 5000 samples (from column 1 to T=5000). The sampled values are marked for instance for the first, fourth and $T^{th}$ cells in the first line in following convention: $V_{1,1}$ designates the signal intensity for the first inter-pulse duration (row=1) for the first cell, and likewise $V_{1,4}$ designates the signal intensity for the first inter-pulse duration (row=I) and for the fourth cell and $V_{1,1}$ designates the signal intensity for the first inter-pulse duration (row=1) and for the $I^{th}$ cell. In a similar fashion, the signals are sampled for every cell from among the 5000 cells within the 250 μsec duration. The procedure is repeated for the succeeding 250 μsec inter-pulse duration (second row in the table of FIG. 5B). The signal intensity for the first cell in the second row is marked $V_{2,1}$ and so forth until the whole values for K lines of the first bulk are filled in ($V_{K,i,\ where}$ 1≦i≦T).

Now, a non-coherent integration is performed which, by this particular embodiment, includes performing the following: for every cell (from among the I cells), 49 K vertical cells are summed, giving rise to an interim sum 401. The interim sum is compared to a threshold 402 and in case it exceeds the threshold 403, this suggests that prima facie a candidate true signal is detected and it is marked as such 404, otherwise if it does not exceed the threshold 405 it is marked as a noise 406. The procedure is performed substantially simultaneously for all I cells within the first bulk (407 and 408). The vertical summation is illustrated in FIG. 5B, e.g. in cell #4 the values, $V_{1,4}$ $V_{2,4}$ ... $V_{k,4}$ are all summed and compared to threshold. This is performed for every one of the 5000 cells.

For illustrating the foregoing, attention is drawn again to FIG. 5A, and focusing on the first bulk (N=1), the marking is indicated by means of $1_K$ in case it exceeds the threshold, and otherwise $0_K$. Note, for instance, that in the first bulk in cells #4, #7 and #T-2 a candidate true signal is found as marked by the "$1_K$" value, whereas in the other cells no candidates are found as marked by the "$0_K$" value. It is accordingly appreciated that there may be more than one detected candidate per bulk. This stems from random picks of noise, inherent inaccuracy in thresholding, etc. However, the vast majority of the options are eliminated since, at most, only few cells will indicate a candidate true signal, whereas the vast majority of the cells (in which noise only was sampled) the interim sum will not exceed the threshold eliminating the option of true signal presence (low FAR).

Accordingly, the first intra-bulk calculation dramatically narrowed the search window for true signals. Note also that by this embodiment, insofar as real-time calculations are concerned, the non-coherent integration calculations are very fast, since they involve only simple summation of values in vertical cells, and then comparing them to a threshold.

Having described the intra-bulk calculation for the first bulk, the procedure is repeated in accordance with a certain embodiment for the next bulk (409 to 411), until all N bulks are processed 412. As illustrated in FIG. 5A, for the second bulk (N=2) only the interim sum for the fifth cell (505) exceeded the threshold, and therefore signifies a candidate for a true signal. Similarly, the third bulk revealed a candidate for a true signal in the third and six cells (506 and 507) and the calculation covered all the 8 bulks. Note that the processing of N bulks further improves the Signal/Noise ratio. Thus, as may be recalled, the intra-bulk calculation of K pulses improves the Signal/Noise ratio by the substantially $\sqrt{K}$ factor. Now, processing N bulks of k pulses each will further improve the Signal/Noise ratio by another factor of R (being up to about) $\sqrt{N}$ giving rise to an enhancement of Signal/Noise by a factor of substantially $\sqrt{K} \cdot R$ compared to the Signal/Noise ratio of a distinct pulse received by the sensor.

In accordance with certain embodiments, having determined candidates for true signal in each one of (or few from among) the N bulks, there follows an inter-bulk calculation for determining a link between candidate signals and thereby detecting a true signal from among the candidate true signals. As may be recalled, in accordance with certain embodiments, there is an underlying assumption that within a bulk, the signal substantially does not drift to a neighboring cell. However, in a transition from a bulk to the next bulk (each extending to a duration of about 25 msec (a term which, as may be recalled, is composed from 250μ inter-pulse duration multiplied by K [100] cycles)), it is likely that the signal will "shift" to a neighboring vertical cell, since the intercepting platform and the target have changed their relative position (and possibly also other factors discussed in detail above), naturally imposing deflection of the reflected signal as received by the sensor that is fitted on the intercepting target. Note, however, that in certain embodiments, the shift to neighboring cells is likely to be gradual due to the relatively short time duration (e.g. 25 msec) of each bulk. In accordance with certain embodiments the specified gradual shift exemplifies one form of a link between candidate signals.

In accordance with certain embodiments, in order to detect the true signal, what remains to be done is simply to identify a gradual shift of sufficient candidate signals (e.g. M out of N, see below), such as the one marked 510 in FIG. 5A. The gradual shift requirement will discard the faulty candidates such as candidates 511, 512, 506 and 513. Thus, in accordance with certain embodiments, it is required to identify a gradual shift which is manifested as a straight line with M out of N detections (M<N) (413 and 414 in FIG. 4). For instance, in the example of FIG. 5A, in 510, 7 out of 8 interim sums (i.e. 7 out of the 8 bulks) identified a candidate signal (except for the N=6 514). The mis-detection of the latter bulk may stem from various reasons such as noise, etc.

In accordance with certain embodiments, the value of M (whether static or dynamic) may be determined depending upon various parameters, all depending upon the particular application.

In accordance with certain embodiments, the link between candidate signals is not necessarily a straight line, skipping in each bulk one vertical cell.

In accordance with certain embodiments, the link is not necessarily a straight line, and may be a serpentine line.

Note that the detection of the gradual shift requires only few calculations, since due to the initial calculation phase of non-coherent intra-bulk integration there are not many true signal candidates, which, in accordance with certain embodiments, is advantageous for realtime calculation requirements.

In accordance with certain embodiments, having detected the true signal (processed in respect of one sector of the sensor, say channel A 31 of FIG. 3), the processing is conducted substantially simultaneously in the other sensor's sectors, and based on detected true signal intensities in one or more of the sectors, it is possible to readily calculate the LOS direction and/or LOS direction rates (based on relative signal intensities in the cell that identified true signal) and therefrom derive steering command update, all as known per se.

In accordance with certain embodiments, the actual signal intensities that are used to calculate the LOS direction and/or LOS direction rates data are the most real-time detected signals. Thus, with reference to FIG. 5A, the signal intensities that will be used to calculate the LOS direction and/or LOS direction rates data are extracted from the last bulk ($8^{TH}$ in FIG. 5A) or last few hulks (say $7^{TH}$ and $8^{TH}$) which represent more real time updated reflected signal data compared to previous bulks such as the $1^{ST}$ and $2^{ND}$.

In accordance with certain embodiments, the processing of some or all of the bulks (e.g. from the second to the $N^{TH}$ bulk) does not necessarily require processing of all I cells per bulk. Thus, by way of non limiting example, only cells that are in the vicinity of cells which identified a candidate signal in the previous bulks are processed. For instance, if cell #i of a given bulk identified a candidate signal, then in the succeeding bulk only cells i−j≦i≦i+j are examined, since candidate signals are searched in the vicinity of other candidate signals.

Reverting now to FIG. 4, the procedure (i.e. calculation of steering command update) is repeated in respect of the next update (415, 416), e.g. $S_2$ in FIG. 5A processing in a similar fashion the next 800 samples. The procedure is repeated for the remaining 3 updates thereby achieving 5 updates per second.

In accordance with certain embodiments, as the intercepting platform approaches the target, the signal intensity intensifies and it is now desired to increase the number of updates per second, e.g. n=20. By this example and assuming that K is still 100 (during which the signal is not likely to drift to neighboring cells), there are only two available bulks, since 20 updates per second for 4000 samples, leaves 200 samples per update (i.e. S=200, compared to 800 when 5 updates per second were performed), and considering that K=100, it readily arises that there are 2 bulks per update.

In accordance with certain embodiments, as the intercepting platform approaches the target, the Signal/Noise ratio inherently increases, and therefore K can be reduced and/or the threshold in K can be increased and/or N can be reduced and/or M can be increased.

For more updates per second, in accordance with certain embodiments of the invention, the procedure is performed in a similar fashion to that described with reference to FIG. 4 above, except that there are fewer bulks, as shown schematically in FIG. 5C. By this example it may be determined that for N=2 and M is also 2. Note that as the platform approaches the target, the number of faulty candidate signals is likely to diminish, since the signal to noise ratio inherently improves, giving rise to improved POD.

Figure 5C:
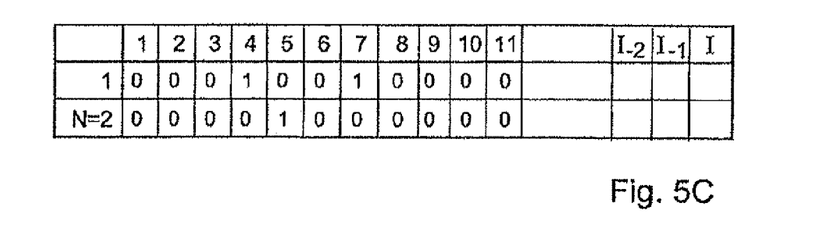

Note also that the enhancement factor of Signal/Noise is diminished in the embodiment of FIG. 5C compared to that of 5A since N is reduced from 8 to 2 (and therefore the total improvement of Signal/Noise i.e. $\sqrt{K} \cdot R$ reduces), however, this reduction in Signal/Noise enhancement is compensated by the inherent better Signal/Noise ratio of each received sampled signal, bearing in mind that the intercepting platform is closer to the target (compared to the situation that corresponds to FIG. 5A). The net effect would then be that despite the lower Signal/Noise enhancement (due to lower R value), the prospects of identifying faulty candidate signals diminishes due to the better inherent Signal/Noise ratio of each received signal.

In accordance with certain embodiments, due to the improved Signal/Noise ratio of each received signal, and further bearing is mind that K signals are processed (in non-coherent integration) for identifying a candidate true signal, the threshold for identifying candidate signal (see 37 and 38 in FIG. 3) is increased with the net effect that signals that are identified as candidate signals in the non-coherent integration phase are more likely to be true signals rather than false alarms.

In accordance with certain embodiments, instead of detecting true signals by analyzing separately the matrix of each channel, the results are integrated and only then true signal is sought. For a better understanding of the foregoing, attention is drawn again to FIG. 5A, exemplifying the intra bulk matrix of channel A. In the previous embodiment, the M out of N criterion was applied to the matrix of channel A and separately for the matrices of the other respective channels. In accordance with certain other embodiments, the matrices of the respective channels are logically ORed (for coping with the scenario that the target "drifted" from a sector to a neighboring sector), such that if a candidate signal is identified in a matrix that corresponds to at least one of the channels, this will be reflected in the integrated matrix. Consider, for example, the $6^{TH}$ bulk for the $9^{TH}$ cell for channel A. As readily shown in FIG. 5A (representing the matrix for channel A) no candidate signal is detected (514). In accordance with the current embodiments, if in one of the other channels (B to D) the non-coherent integration for the $6^{TH}$ bulk for the $9^{TH}$ cell gave rise to detection of candidate signal, the result in the integrated matrix would be 1 (i.e. detection of candidate signal), since the results of the four matrices of the respective channels were subjected to logical OR.

Now, the M out of N criterion is applied to the integrated matrix, and in the case of match (i.e. M out of N candidate signal are found), the signal intensities in the respective channels are processed for determining the LOS direction and/or LOS direction rates data. Note that in accordance with certain embodiments, only data from matrices that distinctly identified candidate signals are evaluated for LOS direction and/or LOS direction rate data determination. In accordance with certain embodiments described with reference to FIGS. 5A-C, the log history of number of bulks was modified according to the number of updates per second, such that the more the updates, the shorter the history log (e.g. history log of 2 bulks for 20 updates per second compared to 8 bulks for 5 updates per second).

Figure 5D:
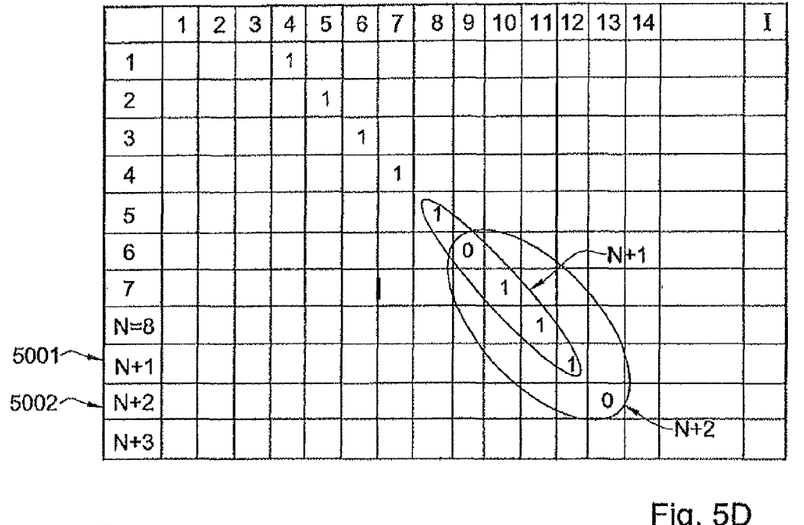

In accordance with certain embodiments, and with reference also to FIG. 5D, the history log does not necessarily modify as a function of updates per second. Thus, reverting to the example of 5 updates and history log of 8 (bulks), if it is desired to switch to higher update rate, say 40, this means that every 25 msec a new steering command update should be calculated and triggered. As may be recalled, in the latter example each bulk extends for 25 msec (100 cycles of 250 μsec each). Thus, when the next bulk is filled (i.e. the 5000 sampled signals are logged, all as explained in detail above with reference also to FIG. 5B, it is required to detect the true signal and apply the specified LOS direction and/or LOS direction rates calculations for generating a steering command.

This is clearly illustrated in FIG. 5D, where the first 8 bulks are identical to those depicted in FIG. 5A, and the next (N+1) bulk 5000 is processed. Now the same history log is processed, say 8 bulks starting from bulk #2 until bulk #N+1, looking for M out of N matches exactly as described with reference to the various embodiments above. In case a match has been encountered (M out of N), the true signal is detected (for determining the angular error and angular error rate) and thereform the steering command update. Now, after additional 25 msec, another bulk s available (#N+2 5001 in FIG. 5D) and M out of N detections are sought for bulks #3 to #N+2 (giving rise to a sliding window), and so forth.

In accordance with certain embodiments, using a longer history for high update rates increases the reliability of detection compared to shorter history, since for example in shorter history log, of say N=2, M can only be 2.

In certain embodiments M may be modified, statically or dynamically, whichever the case may be, e.g. in the case of improving Signal/Noise ratio, a better M out of N ratio may be required.

In accordance with certain other embodiments, the history log can be modified depending on various parameters and not necessarily based on the number of updates per second. For instance, in accordance with certain embodiments, assuming that K is determined based on the foregoing considerations (and achieving $\sqrt{K}$ Signal/Noise enhancement), N is determined in order to achieve pre-defined desired S Signal/Noise ratio (i.e. $\sqrt{K} \cdot R$), notwithstanding the fact that S (i.e. K·N) is too large to comply with the equation S·n=F. In other words, the processing of S pulses will achieve desired Signal/Noise ratio, but this at the penalty that the desired number of updates (n) will not be achieved. Thus, in accordance with certain embodiments, once S pulses are processed and a link of M out of N candidate signals are found (thereby detecting a true signal), the most updated (real-time) candidate signals intensities serve for calculating the LOS direction and/or LOS direction rates, all as explained in greater detail above. As the inherent Signal/Noise ratio improves (e.g. by approaching the target), N can be reduced (e.g. using shorter log history), and higher update rates can be achieved, all as discussed in detail above, with reference to various embodiments of the invention. In other words, unlike previous embodiments where the number of desired updates per second n prescribed S (such that S·n=F) which, in turn, prescribed the number of rows N (assuming by this example fixed K value), then in accordance with the latter embodiment S is not determined according to n, but rather in order to maintain a desired Signal/Noise enhancement of (i.e. $\sqrt{K}\cdot R$) even if S (which equals N·K) does not meet the provisions S·n=F, but rather S·n>F (n being the desired updates per second). The net effect is then that higher Signal/Noise ratio is achieved at the cost of lower number of updates per second. Note that the lower number of updates is mainly relevant in the initial phase of pre-detecting the target (i.e. before detecting true signal). Later on, when true signal is detected, the update rate can be increased drastically, e.g. every new processed bulk allows another update.

Those versed in the art will readily appreciate that the numerical examples provided with reference to FIGS. 4 and 5 are given for illustrative purposes only, and are by no means binding. Those versed in the art will readily appreciate that the invention is not bound by the used of matrices as depicted in FIG. 5, which are provided for convenience and illustrative purposes only.

In accordance with certain embodiments of the invention, there is invoked a pre search phase of non-coherent integration for n cells, say 4000 in the example above, (instead of K=100 as discussed in respect of various embodiments above). As has been discussed above, each cell that accommodates a signal rather than noise should have a higher value (assuming that the signal contributes higher value than noise). Thus, a vertical summation of a given cell which includes a signal is likely to have higher value than a vertical summation of a cell that does not include a signal component but rather only a noise. As has also discussed above, the received signal will not "reside" in the same vertical cell throughout the entire duration of 1 second (that is composed of the 250 µsec of inter pulse duration multiplied by the n (4000) intervals) and is likely to drift to neighboring cells. Note that 1 second is an example only and the duration can be longer or shorter, whichever the case may be.

Still, the number of vertical cells that are "contaminated" by signal that drifts during the 1 second duration (being an example) is considerably smaller than the total of I (5000) cells. In other words, not the entire cells that encompass inter-pulse duration (5000 by this example) need to be processed, but rather cells that fall in a searchable time interval that is less than the specified inter-pulse time duration, should be considered.

For instance, consider FIG. 5A, where, as shown, the signal drifted during S1 duration (800 inter-pulse durations) and "contaminated" 8 groups of vertical cells (from cell number 4 to 11) out of the I (5000) cells. Extrapolating the specified behavior to 4000 inter-pulse durations, would amount to "contamination" of 40 out of the 5000 (T) vertical cells, being an example of the searchable time interval. In respect of each of the specified cells, the non-coherent integration is likely to give rise to higher summed value compared to cells which did not include signal component. Thus, by this example the specified searchable time interval is determined based on a non-coherent integration criterion, being in this non-limiting example that the non-coherent integration value is likely to give rise to higher value (within the searchable time interval) compared to cells which are non included in the searchable time interval.

Note that applying the specified non-coherent integration is of low computational complexity and therefore can be applied in realtime.

Figure 6:
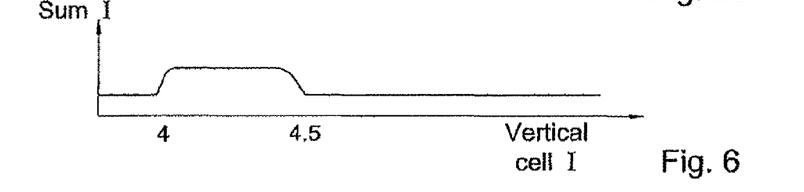
FIG. 6 is a graph representation illustrating schematically non-coherent integration value (ordinate) vs. vertical cell number from 1 to I (abscissa), in accordance with certain embodiments of the invention.

A sum value graph is illustrated schematically (only) as a graph representation of FIG. 6, showing non-coherent sum value (ordinate) vs. vertical cell number from 1 to I (abscissa). The sum is of higher value in the few tens of cells (e.g. from cell #4 to 45) (within the searchable time interval), compared to a multitude of other cells that fall into the inter-pulse time duration. Note that even if there are spikes (i.e. large value in other cells), due to higher noise value, which seemingly look similar to a signal (not shown in FIG. 6), this will occur in a sporadic fashion and is not likely to extend over consecutive cells, as is the case with the real signal.

Having identified the narrow range of cells in which the signal is likely to fall (the searchable time interval), there follows a subsequent phase, discussed in detail with reference to FIGS. 1 to 5 above, for identifying within the narrow range (say 45 cells instead of 5000) the precise location of the signal, and derive the required LOS related data. The procedure would be of course considerably simpler and faster, bearing in mind that the signal will be located within very narrow range rather than sought across the entire I cells.

The present invention has been described with a certain degree of particularity, but those versed in the art will readily appreciate that various alterations and modifications may be carried out, without departing from the scope of the following Claims:

The invention claimed is:

1. A system, comprising:
a laser designator configured to continuously designate a target with a pulsed laser spot;
a sensor and associated processor configured to receive a reflection of the laser spot, convert the received energy to plurality of signals, processing the signals for detecting at least one true reflected signal, wherein said detection of said at least one true reflected signal includes determining at least one candidate true signal using non-coherent integration, and wherein said sensor and associated processor are configured to process at least one of the true reflected signals for generating target related action, and to detect said at least one true reflected signal notwithstanding an inherent low Signal/Noise ratio of below 4 of received signals from among said plurality of signals due to at least one factor selected from a group that includes low pulse power of the laser designator and distance to target; and
wherein a sampling clock of the received signal in the sensor and a generation clock of the pulses in the laser designator are not synchronized.

2. The system according to claim 1, wherein said laser designator is configured to generate high frequency pulses of at least 1 KHz and low intensity pulses of energy of up to 10 Mili Joules per pulse.

3. The system according to claim 1, wherein said sensor and associated processor are fitted in an intercepting platform.

4. The system according to claim 3, wherein said intercepting platform being a missile.

5. The system according to claim 1, wherein the laser designator can be carried by a person or vehicle.

6. The system according to claim 1, wherein processing of said at least one of the true reflected signals for generating target related action includes obtaining at least one of line of sight to the target related data and time of arrival related data.

7. The system according to claim 6, wherein said line of sight related data includes at least one of line of sight direction and line of sight direction rates.

8. The system according to claim 1, wherein a width of said pulse is smaller than 50 nanoseconds.

9. The system according to claim 1, wherein said target related action includes generating steering commands for guiding an intercepting object onto the target.

10. The system according to claim 1, wherein said target related action includes measuring at least one of distance to target and relative velocity between said laser designator, target and said sensor.

11. The system according to claim 1, wherein said target related action includes displaying target related data on a screen.

12. The system according to claim 1, wherein said sensor and associated processor are configured to determine at least two successive candidate signals and detect a true signal if a link is found between at least two of said candidate signals.

13. The system according to claim 1, wherein said non-coherent integration for determining a candidate signal includes summing K signals for a time duration that does not exceed a maximal time duration during which the expected time receive signal remains substantially invariable to an inter-pulse time duration.

14. The system according to claim 13, wherein said maximal time duration does not exceed K pulses, where K complies with the following equation:

$K (\leq K_{MAX})$ wherein:

$K_{MAX} = (C \cdot t)/(V \cdot T)$ where,
C is the speed of light,
t is the width of a sampling cell
T is an inter-pulse time duration
V the relative velocity between the laser designator, target and said sensor.

15. The system according to claim 1, wherein a time duration between consecutive pulses generated in the laser designator constitutes an inter-pulse time duration, and wherein said inter-pulse time duration T is divided into plurality of I cells each having time duration that substantially matches the width of a pulse as received and processed by the sensor; and wherein said sensor and associated processor are configured to sample and store in each cell a sampled signal value which may be a sought true signal, a noise or combination thereof.

16. The system according to claim 15, wherein said non-coherent integration includes summing K signal values in corresponding vertical cells, each being the $i^{TH}$ cell from among said I cells, and comparing the summed signals to a given threshold in order to give an indication whether the summed signal is a summed candidate true signal or summed noise.

17. The system according to claim 12, wherein said sensor and associated processor are configured to process N bulks of candidate signals and detect a true signal in case a link is found in M bulks of candidate signals, wherein $M \leq N$.

18. The system according to claim 1, wherein said sensor and associated processor are configured to provide target related action at n updates per second and wherein processing of received signals for detecting true signal is configured to extend for up to 1/n sec per update.

19. The system according to claim 12, wherein said sensor and associated processor are configured to process N bulks of candidate true signals each being the result of non-coherent integration of K signals, where a given Signal/Noise ratio enhancement is achievable by a factor of $\sqrt{K}$ compared to a Signal/Noise ratio of a single converted signal due to intra-bulk non coherent integration, and further assuming a desired Signal/Noise ratio enhancement compared to the Signal/Noise ratio of a single converted signal, then said N is selected such that $\sqrt{K} \cdot R \geq$ said desired Signal/Noise ratio, where R being a value up to $\sqrt{N}$.

20. The system according to claim 12, wherein after having detected a true signal, said sensor and associated processor are configured to provide a new update of target related action if a candidate true signal is found in a current bulk of K signals and said link is found among M bulks of N bulks, where N includes the current bulk.

21. The system according to claim 20, wherein a log history of N bulks is maintained, such that every new bulk added to the log entails erasing of the oldest bulk in the log, giving rise to a sliding window log history.

22. The system according to claim 1, wherein said sensor includes at least two sectors and wherein said true reflected signal is calculated from candidate signal indications calculated in at least one of said sectors.

23. The system according to claim 1, wherein relative velocities of the target, the sensor and the laser designator are not known.

24. The system according to claim 1, wherein said laser designator being a fiber optics laser designator.

25. The system according to claim 1, wherein said detecting extends to inter-pulse time duration.

26. The system according to claim 1, wherein said detecting extends to a searchable time interval being less than inter-pulse time duration.

27. The system according to claim 26, wherein said searchable time interval is determined based on non-coherent integration value criterion.

28. A system for use with a laser designator that continuously designates a target with a pulsed laser spot, the laser designator including a generation clock for generating pulses, the system comprising:
a sensor and associated processor configured to receive a reflection of the laser spot, convert the received energy to plurality of signals, processing the signals for detecting at least one true reflected signal and processing at least one of the true reflected signals, for generating target related action, and wherein said sensor and associated processor are configured to detect said at least one true reflected signal notwithstanding an inherent low Signal/Noise ratio of below 4 of received signals from among said plurality of signals due to at least one factor selected from a group that includes the low pulse power of the laser designator and distance to target; and
wherein a sampling clock of the received signal in the sensor and the generation clock are not synchronized.

29. A method for designating a target and in response generating a target related action, comprising:
designating a target with a pulsed laser spot;
receiving a reflection of the laser spot;
converting the received energy to plurality of a signals,
processing the signals for detecting at least one true reflected signal,
notwithstanding an inherent low Signal/Noise ratio of below 4 of received signals from among said plurality of signals due to at least one factor selected from a group that includes the low pulse power and distance to target;
wherein said processing includes applying non-coherent integration and wherein a sampling clock of the received reflection of the laser spot and a generation clock of the pulses designating the target are not synchronized; and processing at least one of the true reflected signals for generating target related action.

30. A system, comprising:

a laser designator configured to continuously designate a target with a pulsed laser spot; a time duration between consecutive pulses generated by said laser designator constitutes an inter-pulse time duration that is divided into plurality of I cells each having time duration that substantially matches a width of a pulse as received and processed by a sensor and associated processor;

the sensor and associated processor are configured to receive a reflection of the laser spot, convert the received energy into a plurality of sampled signals, and store in each cell a sampled signal value which may be a sought true signal, a noise or combination thereof;

the sensor and associated processor are configured to discern between signal and noise for detecting a true reflected signal including applying non-coherent integration of sampled signals, notwithstanding an inherent low Signal/Noise ratio of below 4 of said sampled signals; and wherein a sampling clock of the received signal in the sensor and a generation clock of the pulses in the laser designator are not synchronized.

31. The system according to claim 30, wherein the sensor and associated processor are configured to detect said true reflected signals among cells that extend to inter-pulse time duration.

32. The system according to claim 30, wherein the sensor and associated processor are configured to detect said true reflected signal among J cells that extend to a searchable time interval that is smaller than said inter-pulse duration.

33. The system according to claim 32, wherein said sensor and associated processor are configured to determine said searchable time interval that is smaller than said inter-pulse duration, by applying non-coherent integration to I groups of vertical cells and determine J<I groups of vertical cells which meet a criterion.

34. The system according to claim 33, wherein said criterion being that a non-coherent integration value of any of said J groups of vertical cells is higher than the non-coherent integration value of other vertical groups from among said I groups of vertical cells.

35. The system according to claim 30, wherein said sensor and associated processor are configured to process the true signal for generating target related action.

36. The system according to claim 16, wherein a log signal value is maintained, such that every new signal value added to the log entails erases the oldest signal value in the log, giving rise to a sliding window log history.

* * * * *